United States Patent [19]

Johnson et al.

[11] 3,937,093
[45] Feb. 10, 1976

[54] MARINE PROPULSION DEVICE WITH ANCHORING MEANS FOR PROPELLER SHAFT BEARING CARRIER

[75] Inventors: Ronald G. Johnson, Kenosha, Wis.; Gerald E. Kashmerick, Waukegan, Ill.

[73] Assignee: Outboard Marine Corporation, Waukegan, Ill.

[22] Filed: Sept. 5, 1974

[21] Appl. No.: 503,344

[52] U.S. Cl. ................................ 74/417; 115/17
[51] Int. Cl.² .................... F16H 1/14; B63H 5/13
[58] Field of Search ........ 74/417, 423 X; 115/17 X, 115/35

[56] References Cited
UNITED STATES PATENTS

| | | | |
|---|---|---|---|
| 3,382,838 | 5/1968 | Bergstedt | 74/417 X |
| 3,447,504 | 6/1969 | Shimanckas | 115/17 X |

*Primary Examiner*—Leonard H. Gerin
*Attorney, Agent, or Firm*—Michael, Best & Friedrich

[57] ABSTRACT

Disclosed herein is a lower unit for a marine propulsion device including a drive shaft housing, a gearcase housing connected to the end lower of the drive shaft housing and having an interior wall defining an elongated, axially extending cavity, a propeller shaft extending axially in the gearcase housing cavity and carrying a propeller, and a hollow bearing carrier member generally encircling the propeller shaft and carrying a bearing for rotatably supporting the propeller shaft in the gearcase housing cavity. The bearing carrier member is removably fastened by bolts or the like to a resilient, annular anchoring element which fits into and frictionally engages an internal annular groove in the gearcase housing to retain the bearing carrier against the axial displacement relative to the gearcase housing and to minimize rotation of the bearing carrier relative to the gearcase housing. The bearing carrier member includes a radially extending rib which registers with a gap provided in the anchoring element to automatically index the bearing carrier member with the anchoring element during assembly.

12 Claims, 4 Drawing Figures

U.S. Patent  Feb. 10, 1976  3,937,093
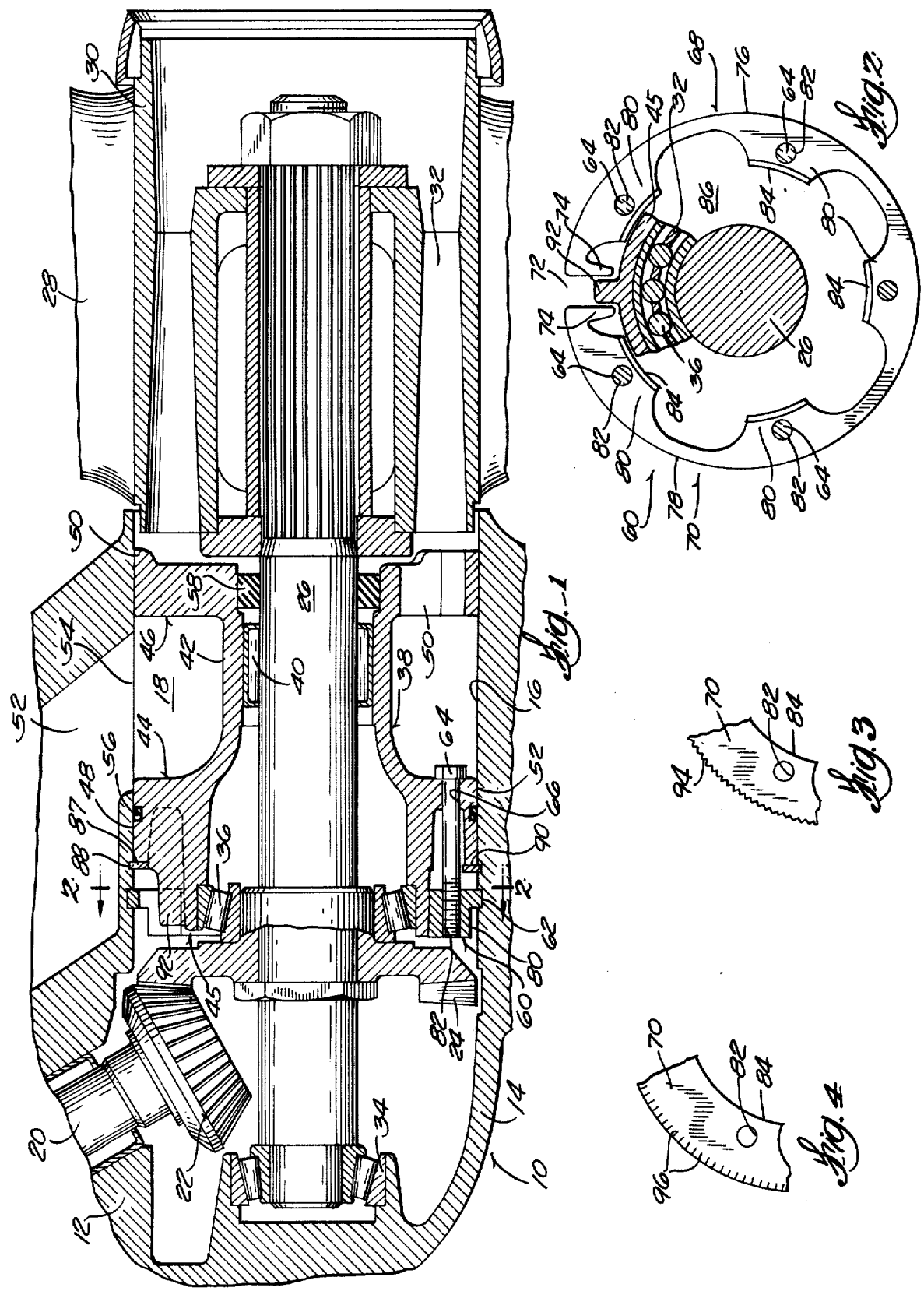

MARINE PROPULSION DEVICE WITH ANCHORING MEANS FOR PROPELLER SHAFT BEARING CARRIER

BACKGROUND OF THE INVENTION

This invention relates to marine propulsion devices, such as outboard motors and stern drive units, and, more particularly, to lower units therefor.

Lower units for marine propulsion devices typically include an upright or angle drive shaft which is rotatably supported in a drive shaft housing and drives a propeller through a gearing arrangement mounted in a gearcase housing connected to the lower end of the drive shaft housing. A propeller shaft is rotatably supported in one or more bearings carried by a bearing carrier member which is supported from and anchored to the interior of the gearcase housing. Prior art arrangements used for anchoring the bearing carrier member to the gearcase housing usually employed several components and did not satisfactorily prevent the bearing carrier from rotating relative to the gearcase housing during operation.

Filed herewith with the Patent Office is a copy of a drawing illustrating a prior art arrangement for rotatably supporting a propeller shaft in the lower unit of the marine propulsion device.

SUMMARY OF THE INVENTION

The invention provides a lower unit for a marine propulsion device including a gearcase housing connected to the lower end of a drive shaft housing and having an interior wall defining an elongated, axially extending cavity, a propeller shaft extending axially in the gearcase cavity and carrying a propeller, a bearing carrier member located in the gearcase cavity and carrying a bearing rotatably supporting the propeller shaft, and a resilient annular anchoring element which fits into an internal groove provided in the interior wall of the gearcase housing and to which the housing carrier member is fastened for retaining the bearing carrier member against axial displacement relative to the gearcase housing. The anchoring element is compressible in the plane of the element for insertion into the groove and expands into tight frictional engagement with the groove.

Also in accordance with the invention, the bearing carrier member includes a nose portion which fits inside the annular anchoring element and wedges the anchoring element radially outwardly into tight frictional engagement with the groove so as to minimize rotation of the bearing carrier member relative to the gearcase housing. Serrations for biting into the groove to produce a further anti-rotation effect can be provided on the outer peripheral portions of the anchoring element.

In further accordance with the invention, the anchoring element includes a pair of generally semicircular, opposed legs which are integrally connected at one end and are spaced apart at the other end to form a gap or opening between the legs. The nose portion of the bearing carrier member can include a radially extending rib which registers with the gap or opening between the anchoring element legs to afford automatic indexing of the bearing carrier member with the anchoring element during assembly.

One of the principal features of the invention is the provision of a lower unit for a propulsion device including a simplified means for anchoring a bearing carrier member which rotatably supports the propeller shaft from the gearcase housing.

Another of the features of the invention is the provision of such an anchoring means which is arranged to cooperate with the bearing carrier member so as to minimize rotation of the bearing carrier member relative to the gearcase housing.

A further feature of the invention is the provision of such an anchoring means and bearing carrier member which are fastened together by bolts or the like and which are arranged so that the bearing carrier is automatically indexed with the anchoring element during assembly to facilitate installation of the bolts.

Other features and advantages of the invention will become apparent upon reviewing the following detailed description, the drawing and the appended claims.

BRIEF DESCRIPTION OF THE DRAWINGS

FIG. 1 is a fragmentary, partially sectioned view of a lower unit of a marine propulsion device embodying various of the features of the invention.

FIG. 2 is a sectional view taken along line 2—2 in FIG. 1.

FIG. 3 is a fragmentary view of an alternate arrangement for the anchoring element.

FIG. 4 is a further alternate arrangement for the anchoring element.

DESCRIPTION OF THE PREFERRED EMBODIMENTS

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

Fragmentarily illustrated in FIG. 1 is a lower unit 10 of a marine propulsion device, such as an outboard motor or a stern drive unit. The lower unit 10 is supported from a boat (not shown) in the usual manner for vertical tilting and for steering. The lower unit 10 has a drive shaft housing 12 and a gearcase housing 14 which is connected to the lower end of the drive shaft housing 12 and includes an interior wall 16 defining an elongated, generally cylindrical cavity 18.

Rotatably supported within the drive shaft housing 12 and operably connected to a suitable source of power, such as an engine (not shown), is a drive shaft 20 carrying a beveled pinion gear 22. The pinion gear 22 meshes with a drive gear 24 mounted on a propeller shaft 26 to drive a propeller 28 (shown fragmentarily) carried on the rear or aft end of the propeller shaft 26. The propeller 28 can have a hub 30 with an axial passage 32 to afford underwater discharge of exhaust gases. It should be understood that the invention is not limited to a through-the-hub exhaust arrangement.

The propeller shaft 26 extends axially in the gearcase cavity 18 and is rotatably supported therein by a thrust bearing 34 suitably mounted in the forward portion of the gearcase housing 14, a thrust bearing 36 located adjacent the drive gear 24 and carried by a bearing carrier member 38, and a needle bearing 40 supported by the bearing carrier member 38. The bearing carrier member 38 is of a hollow or spool-like construction and generally encircles the propeller shaft 26. The bearing carrier member 38 includes a generally cylindrical sleeve portion 42, an annular forward portion 44 connected to the forward end of the sleeve portion 42 and having a generally cylindrical nose portion 45 adapted to carry the thrust bearing 36, and a spider section 46 connected to the rear or aft end of the sleeve portion 42. The forward section 44 has a generally circular, outer peripheral surface 48 which fits snugly against the interior wall 16 of the gearcase housing 14. The spider section 46 has a plurality of circumferentially spaced, radially extending legs 50 which at the outer ends rest against the interior wall 16 of the gearcase housing 14.

Provided in the drive shaft housing 12 for exhausting the exhaust gases from the engine or motor into the water is an exhaust passage 52 which communicates with the gearcase cavity 18 through an opening 54. Exhaust gases exit rearwardly from the gearcase cavity 18 through the openings between the spider section legs 50 and are discharged into the water through the propeller hub passage 32. Water and exhaust gases are prevented from reaching the bearings 34, 36 and 40 and the gears 22 and 24 by an O-ring 56 disposed in sealing engagement between the forward section 44 of the bearing carrier member 38 and the interior wall 16 of the gearcase housing 14 and an annular sealing member 58 disposed in sealing engagement between the propeller shaft 26 and the spider section 46 of the bearing carrier member 38.

To prevent axial displacement of the propeller shaft 26 relative to the gearcase housing 14, means are provided for removably anchoring the bearing carrier member 38 to the interior wall 16 of the gearcase housing 14. In accordance with the invention, such an anchoring means includes an annular anchoring element 60 which fits into an internal groove 62 provided in the interior wall 16 of the gearcase housing 14 and axially spaced rearwardly from the drive gear 24. To afford insertion into the groove 62 during assembly and subsequent expansion into frictional engagement with the groove 62, the anchoring element 60 is constructed from a relative resilient material and is arranged in the manner to afford compression and expansion thereof in the plane of the element.

Means are provided for removably fastening the bearing carrier member 38 to the anchoring element 60. In the specific construction illustrated, such fastening means includes a plurality of bolts 64 which extend through axial apertures 66 provided in the forward section 44 of the bearing carrier member 38 and which are threaded into the anchoring element 60.

More specifically, as best shown in FIG. 2, the anchoring element 60 preferably has a construction generally resembling that of a split or snap ring retainer and includes a pair of generally semicircular, opposed legs 68 and 70 which are integrally connected at one end and are spaced apart at the other end to form a gap or opening 72 therebetween. The unconnected ends of the legs 68 and 70 can be provided with radially inwardly extending fingers 74 which are pulled toward each other to facilitate compression of the anchoring element 60 for insertion into the groove 62. The legs 68 and 70 include respective outer rim portions 76 and 78 which fit into the groove 62.

Projecting radially inwardly from the legs 68 and 70 are a plurality of circumferentially spaced lugs 80 each of which includes a tapped or threaded aperture 82 for receiving one of the bolts 64 and an arcuate inner surface 84. As best shown in FIG. 2, the inner surfaces 84 of the lugs 80 define a generally circular, central opening 86 for receiving the nose portion 45 of the bearing carrier member 38.

In order to minimize rotation of the bearing carrier member 38 relative to the gearcase housing 14, the nose portion 45 preferably is tapered and has an outer diameter slightly greater than the inside diameter of the central opening 86. With this arrangement, the nose portion 45 applies a wedging action on the anchoring element legs 68 and 70 during tightening of the bolts 64 and forces the outer edges of the legs 68 and 70 radially outwardly into tight frictional engagement with the portion of the gearcase housing 16 forming the bottom of the groove 62.

An abutment means can be provided for limiting the axial movement of the bearing carrier member 38 toward the anchoring element 60 so that an axial clamping action is applied on the anchoring element 60 during tightening of the bolts 64. While various arrangements can be used, in the specific construction illustrated, such abutment means includes a snap ring retainer 87 which fits into an internal groove 88 provided in the gearcase housing wall 16 and axially spaced rearwardly from the groove 62. The snap ring 87 abuts a flat shoulder 90 provided on the forward section 44 of the bearing carrier member 88.

In accordance with a preferred embodiment of the invention, means are provided for automatically indexing the bearing carrier member 38 relative to the anchoring element 60 during assembly so that the apertures 66 in the bearing carrier member 38 are axially aligned with respective apertures 82 in the anchoring element 60. In the specific construction illustrated, such means includes a radially extending rib 92 projecting from the nose portion of the bearing carrier member 38. As best shown in FIG. 2, the rib 92 is arranged so that the nose portion 45 cannot be moved into place inside the central opening 86 of the anchoring element 60 unless the rib 92 is in registry with the opening 72 between the anchoring element legs 68 and 70 and the apertures 66 and 82 are generally axially aligned.

The rib 92 also enhances the anti-rotation effect provided by the anchoring element 60. In the event the bearing carrier member 38 attempts to rotate to the gearcase housing 14, the rib 92 pushes against the outer edge of a finger 74 on the anchoring element 60. This tends to cause expansion of the corresponding anchoring element leg into tighter engagement with the groove 62, thereby providing further resistance to rotation of the bearing carrier member 38 relative to the gearcase housing 14.

If desired, the anti-rotation effect provided by the anchoring element 60 can be enhanced by providing a plurality of circumferentially spaced, axially extending serrations 94 on the outer periphery of the anchoring legs 68 and 70, as illustrated in FIG. 3, and/or by providing a plurality of circumferentially spaced, radially extending serrations 96 on the rear faces of the outer rim portions 76 and 78 of the anchoring legs 68 and 70, as illustrated in FIG. 4. The radially outward expansion of the legs 68 and 70 during assembly causes the serrations 94 to bite into the portion of the gearcase housing wall 16 forming the bottom of the groove 62. Tightening of the bolts 64 draws the serrations 96 into biting engagement with the portion of the gearcase housing wall 16 forming the rear sidewall of the groove 62.

Various of the features of the invention are set forth in the following claims.

We claim:

1. A lower unit for a marine propulsion device comprising a drive shaft housing having a lower end, a gearcase housing connected to said lower end of said drive shaft housing and having an interior wall defining an elongated cavity, a propeller shaft located in and extending axially through said gearcase housing cavity, means for rotatably supporting said propeller shaft inside said gearcase housing including a hollow bearing carrier member which is in encircling relation with said propeller shaft, is supported from said interior wall of said gearcase housing, and carries a bearing rotatably engaging said propeller shaft, and means for anchoring said bearing carrier member to said interior wall of said gearcase housing including an annular, internal groove in said gearcase housing, a resilient, annular anchoring element which is located in said groove and which is capable of being compressed in the plane of said anchoring element for insertion into said groove and thereafter expanded to thereby retain said anchoring element in said groove and against axial displacement relative to said gearcase housing, and means for fastening said bearing carrier member to said anchoring element when the anchoring element is in said groove.

2. A lower unit according to claim 1 wherein said bearing carrier member includes a forward end portion having a shoulder facing said anchoring element, and said gearcase housing includes an abutment means axially spaced from said anchoring element for abuttingly engaging said shoulder to limit axial movement of said bearing carrier member towards said anchoring element.

3. A lower unit according to claim 2 wherein said abutment means includes a second annular, internal groove in said internal wall of said gearcase housing axially spaced from said anchoring element and a snap ring retainer located in said second groove.

4. A lower unit according to claim 1 wherein said anchoring element includes a central opening and an outer rim portion fitting into said groove and having an outer peripheral edge, and said bearing carrier member includes a forward end portion having a nose portion which extends axially into the central opening of said anchoring element and has outer dimensions slightly larger than the inside dimensions of the central opening of said anchoring element so that, upon fastening together of said bearing carrier assembly and said anchoring element, said outer peripheral edge of said anchoring element is wedged radially outwardly by said nose portion into tight frictional engagement with said groove.

5. A lower unit according to claim 2 wherein said fastening means comprises a plurality of bolts, said forward end portion of said bearing carrier member includes a plurality of circumferentially spaced, axially extending apertures for receiving said bolts, and said anchoring element includes a pair of generally semicircular, opposed legs integrally connected at one end and circumferentially spaced apart at the other end to form an opening therebetween, said legs having a plurality of circumferentially spaced apertures for threadably receiving said bolts.

6. A lower unit according to claim 5 wherein said bearing carrier member nose portion includes a radially projecting rib for registering with the opening between said anchoring element legs to axially align the apertures of said bearing carrier member with the apertures of said anchoring element.

7. A lower unit according to claim 4 wherein said outer peripheral edge of said anchoring element rim portion includes a plurality of circumferentially spaced, axially extending serrations for biting into the bottom of said groove when said bearing carrier member and said anchoring element are fastened together.

8. A lower unit according to claim 4 wherein the outer rim portion of said anchoring element includes a plurality of circumferentially spaced, radially extending serrations for biting into a sidewall of said groove when said bearing carrier member and said anchoring element are fastened together.

9. A lower unit for a marine propulsion device comprising a drive shaft housing having a lower end, a gearcase housing connected to said lower end of said drive shaft housing and having an interior wall defining an elongated cavity, a propeller shaft located in and extending axially through said gearcase housing cavity, means for rotatably supporting said propeller shaft inside said gearcase housing including a hollow bearing carrier member which is in encircling relation with said propeller shaft, is supported from said interior wall of said gearcase housing, and carries a bearing rotatably engaging said propeller shaft, said bearing carrier member including a forward end portion having an axially extending nose portion, an annular, internal groove in said interior wall of said gearcase housing, an annular resilient anchoring element including a pair of generally semicircular opposed legs each having an outer rim portion adapted to fit into said groove and an outer peripheral edge, said legs defining a central opening for receiving said nose portion of said bearing carrier member and being integrally connected at one end and circumferentially spaced apart at the other end to form an opening therebetween such that said legs are compressible toward each other in the plane of said anchoring element to afford insertion of said anchoring element into said groove and subsequently are expandable to afford engagement of said outer rim portions with said groove, the outer dimensions of said nose portion being slightly larger than the inside dimensions of the central opening of said anchoring element so that, upon fastening together of said bearing carrier member and said anchoring element, said outer peripheral edges of said legs are wedged radially outwardly by said nose portion into tight frictional engagement with said groove, and means for fastening said bearing carrier member to said anchoring element.

10. A lower unit according to claim 9 wherein said fastening means comprises a plurality of bolts, said forward end portion of said bearing carrier member includes a plurality of circumferentially spaced, axially extending apertures for receiving said bolts, and said anchoring element legs include a plurality of circumferentially spaced apertures for threadably receiving said bolts.

11. A lower unit according to claim 10 wherein said nose portion of said bearing carrier member includes a radially projecting rib for registering with the opening between said anchoring element legs to axially align the apertures of said bearing carrier member with the apertures of said anchoring element.

12. A lower unit according to claim 11 including a shoulder on said forward end portion of said bearing carrier member facing said anchoring element, a second annular internal groove in said interior wall of said gearcase housing axially spaced from said anchoring element, and a snap ring retainer located in said second groove for abuttingly engaging said shoulder to limit axial movement of said bearing carrier member toward said anchoring element.

* * * * *